July 28, 1964  E. R. POLK ET AL  3,142,601
METHOD AND APPARATUS FOR FABRICATING A PLASTIC CONTAINER
Filed Aug. 10, 1962  2 Sheets-Sheet 1

INVENTORS:
Edgwin R. Polk &
Antonio LaGrassa,
BY Richards & Cifelli,
Attorneys

July 28, 1964   E. R. POLK ET AL   3,142,601
METHOD AND APPARATUS FOR FABRICATING A PLASTIC CONTAINER
Filed Aug. 10, 1962   2 Sheets-Sheet 2

INVENTORS—
Edgwin R. Polk &
BY Antonio LaGrassa,
Richards & Cifelli,
Attorneys

United States Patent Office 3,142,601
Patented July 28, 1964

3,142,601
METHOD AND APPARATUS FOR FABRICATING A PLASTIC CONTAINER
Edgwin R. Polk, 42 Tracy Drive, and Antonio La Grassa, 33 Tracy Drive, both of Fords, N.J.
Filed Aug. 10, 1962, Ser. No. 216,232
6 Claims. (Cl. 156—273)

This invention relates in general to plastic containers such as luggage units, attaché cases, toilet cases, cosmetic and manicure kits, jewelry cases, implement cases, and the like, each of which usually includes two matching hollow tray-like components having peripheral walls and spanning cross walls integral with the respective peripheral walls, and has particular reference to the method of bonding the meeting edge of the peripheral wall, or body, of each of said components to the marginal edge of the cross wall thereof.

When the peripheral wall and cross wall of one of said tray-like components are cut from sheet thermoplastic material and fitted together in marginally abutting relation, their contacting edges may conveniently be bonded together by applying electronically generated heat for a designated period of time sufficient to cause plastic flow and fusion between the walls, commonly called "heat sealing."

Prior to our present invention, it has been conventional practice to bond the peripheral wall of each hollow tray-like component to the related cross wall by a method involving use of a plain flat top electrode and a box-like bottom electrode of substantially the same height as the peripheral wall of the tray-like luggage component, which, for the sake of brevity, will be called hereinafter the "workpiece," and which includes both the peripheral wall and the cross wall.

In accordance with this prior art method, the peripheral wall of the workpiece is enclosed in the box-like bottom electrode and a marginal flap portion of the thermoplastic sheet material of which the peripheral wall is composed is dropped or turned outwardly over the top edge of the bottom electrode. Also a similar flap portion of the cross wall is placed in superimposed contact with the flap of the peripheral wall. The top electrode is sufficiently horizontally extensive to overlie the top edge of the bottom electrode, so that, when electronically generated heat is applied through energization of both electrodes, the abutting flaps of both workpiece walls will become heat sealed together. In consequence of this method of bonding, there will be a lip projecting laterally outward from the outer joined edges of the product. This lip formation is objectionable, except under circumstances to be explained later herein, because of the cost of trimming the unwanted lip and the excess thermoplastic material represented by the marginal flaps.

With the above enumerated disadvantages of the prior art method in view, it is the primary object of our present invention to substitute an improved method which will produce, where desired, a lipless joint between the matching edges of the peripheral wall and cross wall of the workpiece.

To be more explicit, the improved method makes use of electrodes of entirely different structure. The bottom electrode, instead of being box-like to laterally enclose the peripheral wall of the workpiece, is made horizontally flat to support the lower edge of said workpiece and has a surmounting mandrel that fits inside the latter. The top electrode has a depending marginal flange to laterally enclose the abutting edges of the peripheral wall and cross wall of the workpiece. The inner side face of the top electrode flange is specially contoured vertically in order to be downwardly diverging and concave and thereby serve to press the abutting edges of both workpiece walls tightly together in an integral butt joint during application of sealing heat.

The above stated and other objects will become apparent from a reading of the following description of an illustrative embodiment of the invention in connection with the accompanying drawings thereof, in which drawings.

Like characters of reference are applied in the above described views of the heat sealing device of this invention to indicate corresponding parts thereof.

Figure 3:
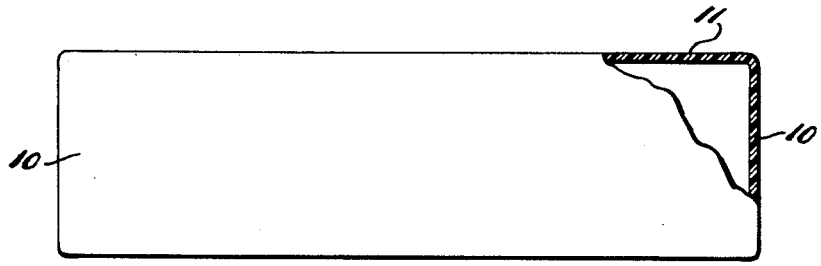
FIG. 3 is a side elevation of the finished product, partially in vertical section, showing the smooth butt joint at the corner of the peripheral and cross walls.

Referring first to FIG. 3, one of the two hollow tray-like components of a typical container is illustrated in finished condition. It will be observed that each such component comprises a peripheral wall 10 and a cross wall 11, which latter may become either the top or bottom wall of a container when the two components have been assembled with the necessary hinges and fastening devices (not shown).

As previously explained, the principal point of novelty in the present invention resides in the employment of electrodes of improved structure in a method which results in an integral butt joint between the matching corner-located edges of the peripheral wall and cross wall of the component under construction.

Figure 1:
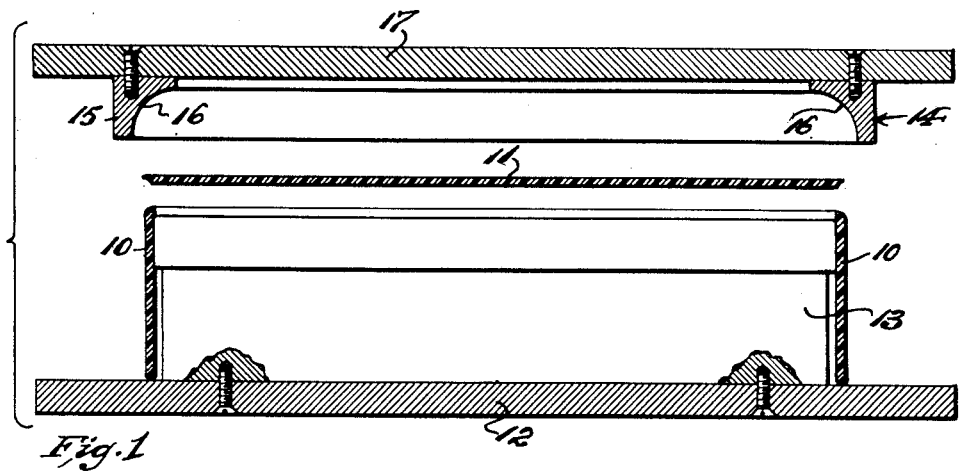
FIG. 1 is an exploded vertical sectional view of the cooperative heat sealing electrodes and workpiece alone.

Referring now to FIG. 1, it will be observed that the new pair of electrodes includes a bottom electrode 12 of flat plate form upon which the peripheral wall 10 of the workpiece is rested. A mandrel 13 corresponding in horizontal cross-sectional form to the interior of peripheral wall 10 of the workpiece surmounts electrode 12 and is nearly as high as said wall 10. A top electrode 14 overlies bottom electrode 12 and incorporated mandrel 13. Top electrode 14 has a depending marginal flange 15 that matches the horizontal outline of peripheral wall 10 of the workpiece and has a downwardly diverging and concave inner face 16 dimensioned to enclose and press against the abutting edges of both the peripheral and cross walls 10 and 11 respectively. Top electrode 14 is incorporated with a platen 17.

Figure 2:
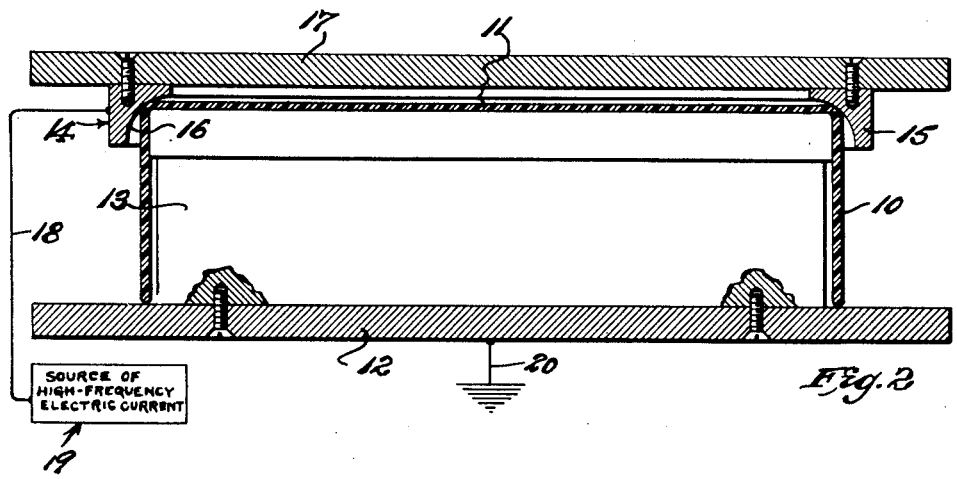
FIG. 2 is a vertical sectional view of the heat sealing electrodes, showing the same with the top electrode closed on the workpiece just before the electrical energy is applied.

As shown in FIG. 2, top electrode 14 is connected by conductor 18 to one pole of a source 19 of electronically generated high-frequency electric current. Bottom electrode 12 is connected in turn by conductor 20 to ground.

*Operation*

The operation of bonding an outer wall 11 of a workpiece to the peripheral wall 10 thereof by electronic heat sealing will now be described.

The bottom electrode 12 of suitable size is loaded in the press of an electronic heating machine (not shown). Then, the peripheral wall 10 of the workpiece is rested upon bottom electrode 12 in enclosing relation to mandrel 13 of the latter. The next step is to place cross wall 11 of the workpiece on top of peripheral wall 10 thereof in accurate marginal registration with the latter, after which top electrode 14 with its incorporated platen 17 is rested upon the abutting edges of walls 10 and 11 of the workpiece. When this has been accomplished and the source of high frequency heating current has been warmed up, the press is operated to close the electric circuit and bring the flange 15 downwardly into pressured contact with the workpiece to cause contoured inner faces 16 of said flange to mold the rounded corners of the butt joint as shown in FIG. 2. When the workpiece is removed from the press, the completed case component will have the one-piece form disclosed in FIG. 3.

The advantages to be realized from the above-described inventive concept include:

(1) A broader bond of the workpiece walls from the inner surface throught to the outer surface at the top of the product insures a stronger, more rigid structure.

(2) The overall appearance of the product is improved because of elimination of the lip produced by the conventional prior art method.

(3) Lower costs are achieved because there is no lip-forming excess plastic material on the workpiece, nor any lip trimming operation.

(4) The contoured top electrode proposed in our concept eliminates the need for a cutting-edge electrode and thereby reduces the number of rejects caused by arc through or burning.

(5) An increased rate of production is the result of fewer activities in the loading and removal operations involved in manufacture of the case component.

(6) The contoured electrode permits the joining of a peripheral wall of one color or material to an outer wall of a contrasting color or material in a manner which will now be described.

Figure 4:
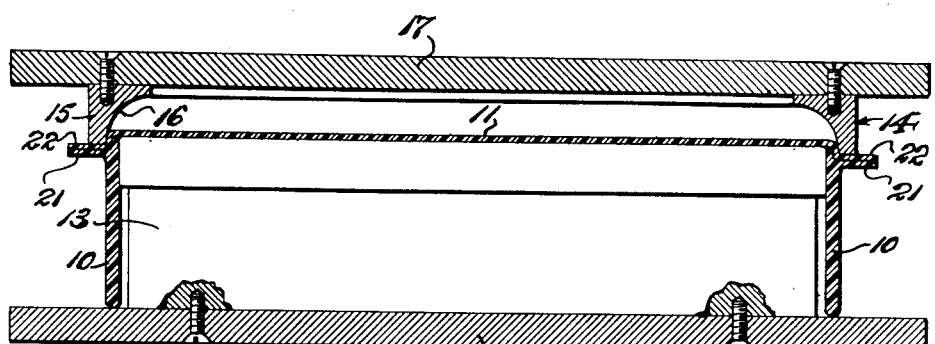
FIG. 4 is a view similar to FIG. 2, showing flaps purposely provided when it becomes desirable to use the new electrodes in production of a container that has attractive exposed lips of different colors, or of different materials.
Figure 5:
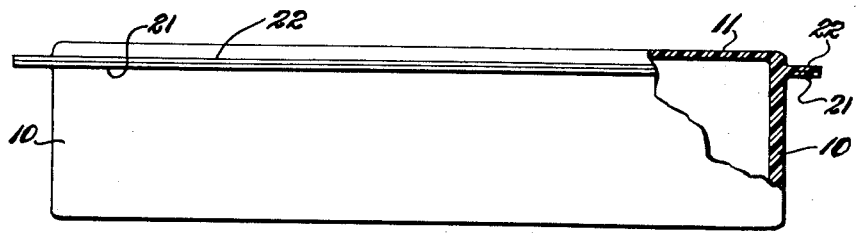
FIG. 5 is a view similar to FIG. 3 of the finished product having contrasting lips.

As previously suggested, there may be occasions when it is desired to produce luggage components in which lips of diffeernt coolrs or materials protrude from the bonded joint between the peripheral and cross walls. This can be done in the manner disclosed in FIG. 4, in accordance with which the upper edge of peripheral wall 10 is provided with a flap 21 of one color or material and the marginal edge of cross wall 11 has a flap 22 of a contrasting color or material. The abutting flaps 21 and 22, which may be of any desired width, are arranged to protrude exteriorly, as shown, before the electronically generated heat is applied to the device. Although this is an alternative method, the results have been demonstrated to be as effective and easy of accomplishment as when no lip is desired, even though such results, to our knowledge, cannot be obtained by any other method.

It is to be understood that any thermoplastic resin commonly employed as a covering material for articles of manufacture may be used in composition of the workpiece of our invention. We presently prefer vinyl materials, such as polyvinyl chloride, or a co-polymer of vinyl acetate and vinyl chloride, suitably plasticized, etc.

While the invention has been illustrated and described with respect to two structural embodiments thereof, it will be understood that it is intended to cover all changes and modifications of the embodiments shown which do not constitute departures from the spirit of the invention and scope of the appended claims.

We claim:

1. An apparatus for heat sealing a thermoplastic workpiece at the intersection of its peripheral wall and a spanning cross wall comprising:
    (a) a generally flat, bottom electrode,
    (b) a mandrel surmounting the bottom electrode and dimensioned to extend to the top edge of the peripheral wall, when it is resting on the bottom electrode and enclosing the mandrel,
    (c) a generally flat, top electrode,
    (d) a marginal flange depending from the top electrode,
    (e) a downwardly diverging inner face on the marginal flange dimensioned to press together the intersecting portions of the peripheral wall and of the cross wall of the work piece, and to position the bottom of the top electrode in spaced relation to the top of the cross wall,
    (f) means to press the inner face upon the intersecting portions,
    (g) means to apply high frequency current to the electrodes whereby the intersecting portions of the workpiece are molded and sealed together in conformity with the inner face of the marginal flange at the point of contact.

2. An apparatus for heat sealing a thermoplastic work piece at the intersection of its peripheral wall and a spanning cross wall comprising:
    (a) an apparatus according to claim 1,
    (b) the downwardly diverging inner face on the marginal flange having a vertically concave contour at the point of engagement with the intersecting portions of the peripheral wall, and the cross wall of the work piece.

3. An apparatus for heat sealing a thermoplastic work piece at the intersection of its peripheral wall and a spanning cross wall comprising:
    (a) an apparatus according to claim 1,
    (b) a generally flat bottom edge on the marginal flange beyond and immediately adjacent to the point where the peripheral wall and cross wall are pressed together, whereby lateral extensions of the peripheral and outer walls are accommodated.

4. The method of producing the hollow tray-like component of a luggage-type container comprising a work piece with a peripheral wall and a spanning cross wall composed of thermoplastic sheet material which are matching in horizontal plan, which method comprises:
    (a) arranging said cross wall in superimposed, marginally abutting contact with the upper edge of said peripheral wall,
    (b) supporting the peripheral wall of the work piece adjacent to the upper edge,
    (c) supporting the spanning cross wall,
    (d) applying arcuate compressive force to the abutting edges of the peripheral wall of the work piece and spanning cross wall,
    (e) simultaneously supplying high frequency electric current at the point of arcuate compression for a period of time sufficient to mold and heat seal together the abutting edges of the work piece in a smoothly rounded continuous edge.

5. The method defined in claim 4 wherein the arcuate compressive force imparts a vertically convex contour to the work piece.

6. The method defined in claim 4 wherein marginal flaps of contrasting thermoplastic material are provided on the respective peripheral and cross wall and are extended laterally outward adjacent to the point of molding and heat sealing the abutting edges.

References Cited in the file of this patent
UNITED STATES PATENTS

| | | |
|---|---|---|
| 2,594,235 | Taylor | Apr. 29, 1952 |
| 2,441,699 | Gramelspacher | May 18, 1948 |
| 2,471,612 | Freeman | May 31, 1949 |
| 2,626,647 | Barton | Jan. 27, 1953 |
| 2,595,501 | Aicher | May 6, 1952 |
| 2,799,759 | Blond et al. | Feb. 18, 1955 |
| 2,765,386 | Vieten | Oct. 2, 1956 |
| 3,098,916 | Souligney | July 23, 1963 |